US009503686B2

(12) United States Patent
Hanson et al.

(10) Patent No.: US 9,503,686 B2
(45) Date of Patent: Nov. 22, 2016

(54) REVIEW BUCKET FOR VIDEO CONFERENCES

(71) Applicant: BANK OF AMERICA CORPORATION, Charlotte, NC (US)

(72) Inventors: Carrie Anne Hanson, Charlotte, NC (US); Alicia C. Jones-McFadden, Fort Mill, SC (US); Craig Sobol, Waxhaw, NC (US); Brent Alan Shelkey, Huntersville, NC (US); Kimberly Ya-chin Chang, Houston, TX (US); Sarah Beth Gottfried, Westlake, OH (US); Wang Liang, Pasadena, CA (US); Neha Rani Rathi, Reston, VA (US); Anthony Scott Wong, Union, KY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/530,052

(22) Filed: Oct. 31, 2014

(65) Prior Publication Data

US 2016/0127683 A1     May 5, 2016

(51) Int. Cl.
*H04N 7/14*       (2006.01)
*H04N 7/15*       (2006.01)
*G06Q 30/00*      (2012.01)
*H04L 12/18*      (2006.01)

(52) U.S. Cl.
CPC .............. *H04N 7/15* (2013.01); *G06Q 30/00* (2013.01); *H04L 12/1813* (2013.01); *H04N 7/141* (2013.01)

(58) Field of Classification Search
USPC ....... 348/14.01, 14.07, 14.08, 14.09, 211.12, 348/333.02, 569
See application file for complete search history.

(56) References Cited

U.S. PATENT DOCUMENTS

| | | |
|---|---|---|
| 6,665,395 B1 | 12/2003 | Busey et al. |
| 7,050,567 B1 | 5/2006 | Jensen |
| 7,746,362 B2 | 6/2010 | Busey et al. |
| 7,848,984 B1 | 12/2010 | Robb |
| 7,890,405 B1 | 2/2011 | Robb |
| 8,195,555 B2 | 6/2012 | Robb |
| 8,374,944 B2 | 2/2013 | Robb |
| 8,539,354 B2 | 9/2013 | Beswick et al. |
| 8,571,195 B2 | 10/2013 | Pasi et al. |
| 8,731,180 B2 | 5/2014 | Benefield et al. |
| 2002/0075304 A1* | 6/2002 | Thompson ............ G06F 3/0481 715/751 |
| 2008/0120101 A1 | 5/2008 | Johnson et al. |
| 2009/0089088 A1* | 4/2009 | Schoenberg ......... G06Q 10/109 705/2 |
| 2011/0099497 A1 | 4/2011 | Fok et al. |
| 2011/0289427 A1 | 11/2011 | Toprani |
| 2011/0320958 A1 | 12/2011 | Kashi |
| 2013/0151301 A1 | 6/2013 | Robb |
| 2014/0143141 A1 | 5/2014 | Kumar |

\* cited by examiner

*Primary Examiner* — Yosef K Laekemariam
(74) *Attorney, Agent, or Firm* — Michael A. Springs; Moore & Van Allen PLLC; Peter B. Stewart

(57) ABSTRACT

Embodiments of the invention detail systems, computer program products, and methods for providing a review bucket for video conferences. In an exemplary embodiment the system presents on a display a review bucket widget that is configured to receive a plurality of discussion topics for use in a video conference communication session between the customer and a business agent that represents a particular entity. To this extent, the system may additionally receive, within the review bucket widget, an identifier of at least one discussion topic that the customer is interested in discussing during the video conference communication session and transmit the at least one discussion topic to the business agent.

23 Claims, 5 Drawing Sheets

REVIEW BUCKET FOR VIDEO CONFERENCES

BACKGROUND

Customers of businesses, such as financial institutions or the like, that have many customer service outlets, otherwise referred to as centers, branches or the like, have come to expect that the various service outlets will have the immediate capability to address many of their particular special needs or services without the need of a physical visit to any of the service outlets. Likewise, businesses such as financial institutions have begun to streamline their operations for the sake of efficiency as they have come to realize that round-the-clock location of agents at each service outlet/center is inefficient. For example, in the financial institution setting, if each banking center employs at least one full-time mortgage/loan agent, a full-time small business agent and/or a full-time personal financial advisor/agent, the agent may only be called upon in regards to their specialty in the event a customer visits the banking center requiring assistance in the area of specialty.

Certain businesses, such as financial institutions and the like, have addressed the problem associated with staffing service outlets with full-time agents by utilizing video conferencing systems. Specifically, such video conferencing systems may employ two-way video conferencing communication between a customer, who is located at the service outlet/banking center, home, or the like, and an agent, who is located remotely from the location of the user such as a service outlet/banking center. Both customer and agent receive audio and video feeds of the other participant. Alternatively, a one-way video conferencing system provides the customer a video and audio feed of a remote agent, while the remote agent is limited to receiving an audio feed from the customer. Such video conferencing systems are set-up in private settings within the business to provide the customer assurance that the information exchanged during the communication session is held in private. In this regard, a any location equipped with video conferencing communication can provide customers on-demand access to agents having different areas of specialty/expertise without requiring the full-time physical presence of the agent at the business outlet/center or the presence of the customer within the business outlet/center.

In certain instances, it becomes apparent that a customer that is participating in a video conferencing communication session or any other media-based communication desires a means to fluidly navigate through the video conferencing session without being distracted from the conference itself. Currently, in the video conferencing environment the user is limited to simple interactions such as an audio/video feed between themselves and the agent. If the user needs to access other screens or documentation they are tasked with manually accomplishing these acts. The current method does not optimize the full potential of video conference communication sessions.

Therefore, a need exists to develop systems, apparatus, methods, computer program products and the like that provide the user with an streamlined and effortless way to interact with the agent during video conference sessions and navigate through various user interfaces, documentation, and presented information. The desired aspects should alleviate problems related to the burdensome navigation through information presented in video conference sessions. In addition, the desired systems, apparatus, methods, computer program products and the like should allow for customer information, private or otherwise, to be shared amongst all participants of the session so as to eliminate the need of the agent to present information to at a later time, such as when the conference has ended.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, computer program products or the like for providing a review bucket for video conferences. An exemplary system for providing a discussion topic reviewing tool may comprise a video conferencing apparatus including a processor, a memory, a display in communication with the processor, a video camera in communication with the processor, a speaker in communication with the processor, and a microphone in communication with the processor, and a video conferencing module. The video conferencing module may be stored in the memory and executable instructions that when executed by the processor cause the processor to initiate presentation on the display of a review bucket configured to receive from a customer a plurality of discussion topics for use in a video conference communication session between the customer and a business agent that represents a particular entity. The system may then receive, within the review bucket, an identifier of at least one discussion topic that the customer is interested in discussing during the video conference communication session, and initiate transmission of the at least one discussion topic to the business agent.

In some embodiments, the review bucket is configured to be compatible with at least one application within the video conference apparatus such that the review bucket can communicate with the at least one application to (i) send information to the at least one application and (ii) receive information from the at least one application.

In some embodiments, the system may be further configured to initiate presentation of the review bucket prior to transmitting an indication that the customer requires communication with the business agent.

In some embodiments, the system may be further configured to initiate presentation of the review bucket in response to transmitting an indication that the customer requires communication with the business agent.

In some embodiments, the system may be further configured to initiate presentation of the review bucket in response to initiating a video conference communication session between the customer and the business agent.

In some embodiments, the system may be further configured to store a reference for the identifier of the at least one discussion topic, and wherein the reference comprises at least one of a screenshot of a webpage, screenshot of the display, a Hypertext Markup Language ("HTML") link, a document name, or a document location.

In some embodiments, the system may be further configured to store metadata of the identifier of the at least one discussion topic, concurrently thereafter categorize the at least one discussion topic based on the stored metadata of the identifier of the at least one discussion topic, and concurrently thereafter assign a level of priority to the at least one discussion topic based on the stored metadata of the identifier of the at least one discussion topic.

In some embodiments, the system may be further configured to receive input from the customer that indicates (i) a category of the at least one discussion topic and (ii) a level of priority of the least one discussion topic, in response to receiving the input that indicate the category of the at least one discussion topic, concurrently thereafter categorize the at least one discussion topic based on the received input from the customer, and in response to receiving the input that indicates the level of priority of the at least one discussion topic, concurrently thereafter assign the level of priority to the at least one discussion topic based on the received information from the customer.

In some embodiments, the system may be further configured to in response to receiving the identifier of the at least one discussion topic, concurrently thereafter assign a level of priority to the at least one discussion topic based on the number of times that the at least one discussion topic was received within the review bucket.

In some embodiments, the system may be further configured to detect that the at least one discussion topic is a duplicate of another discussion topic within the review bucket, prompt the customer to specify whether or not the at least one discussion topic was accidentally received within the review bucket, in response to the customer specifying the at least one discussion topic was accidentally received within the review bucket, remove the at least one discussion topic from the review bucket.

In some embodiments, the system may be further configured to prompt the user to add a description of the at least one discussion topic.

In some embodiments, the system may be further configured to generate a cumulative list two or more discussion topics received within the review bucket, and transmit the cumulative list of the two or more discussion topics received within the review bucket to the business agent.

In some embodiments, the system may be further configured to determine whether the review bucket is operating in online mode or offline mode, and in response to determining the review bucket is operating in online mode, determine to transmit the at least one discussion topic to the business agent.

In some embodiments, the system may be further configured to determine whether the review bucket is operating in online mode or offline mode, and in response to determining the review bucket is operating in offline mode, determine to not transmit the at least one discussion topic to the business agent, and save the at least one discussion topic in a queue for transmission at a later time.

In some embodiments, the system may be further configured to in response to transmitting the at least one discussion topic, concurrently thereafter import information included in the identifier or the at least one discussion topic into an electronic form.

In some embodiments, wherein a video conference communication session between the business agent and the customer is initiated utilizing an automated dialer system that requires the customer to specify a reason for initiating the video conference communication session, the system may be further configured to automatically determine the reason for initiating the video conference communication session based on the identifier of the at least one discussion topic.

In some embodiments, the system may be further configured to transmit an indication that a customer requires communication with a business agent that is remotely located from the customer, and initiate a video conference communication session between the customer and the business agent, wherein initiating the video conference session comprises providing a multimedia interface between the agent and the customer that provides the agent and the customer with an audio and video feedback of one another.

As such, the present invention improves the functionality of video conferencing applications and general communication sessions to provide a tool to the user that provides comprehensive discussion topics accumulated by the user before, during, and after video conferencing or other communication sessions and thereby optimizes the traditional sense of video conferencing. The tool of the present invention is an improvement over traditional video conference methods because it allows the user to accumulate points of discussion by simply dragging and dropping information related to the discussion topic into a review bucket. The present invention reduces the amount of time it takes for a user to convey to business personnel their reasons for contacting the business, and further reduces the time utilized by the business agent to research proposed topics of discussion. In traditional video conferencing, the user is tasked with having to manually inform a business of their reason for calling furthermore the user is tasked with self-inventing new ways to manage information that they was to discuss with the business either in the present or future instances. As such, the present invention eliminates the burden that a user faces of trying to manually keep up with information for a video conference by providing technical solutions that augment or enhance the functionality of a video conference by implementing a review bucket which the user can easily use to manage relevant information and communicate the information to a business during a communication session. For at least these reasons, the present invention related to the review bucket is significantly more than the traditional video conferencing tools.

In addition, the present invention provides tangible results using the dynamic interface that otherwise could not be achieved without the present invention. The tangible results include documents, links, screenshot, and other information that is directly provided to a business agent in real time throughout the video conference. In traditional video conferencing, the business agent is tasked with having to manually research topics to better understand the user's requests. In the present invention the business agent benefits from being able to view the research that the user has already done for themselves, and thus eliminates a task required by the business agent and increases the efficiency of the communication session. Traditionally in some instances, questions may be proposed by the user but there is no way to centrally manage a channel for providing questions and receiving answers. As such, the present invention optimizes traditional video conferences by enhancing the user's interaction with the business to convey potential points of discussion.

Moreover, the system (e.g., processor, or the like) of the present invention cannot be performed by a human with pen and paper because among other reasons, the human would not be able to present the discussion topics to the business agent simultaneously in real-time or near real-time as the user drags information into the review bucket.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
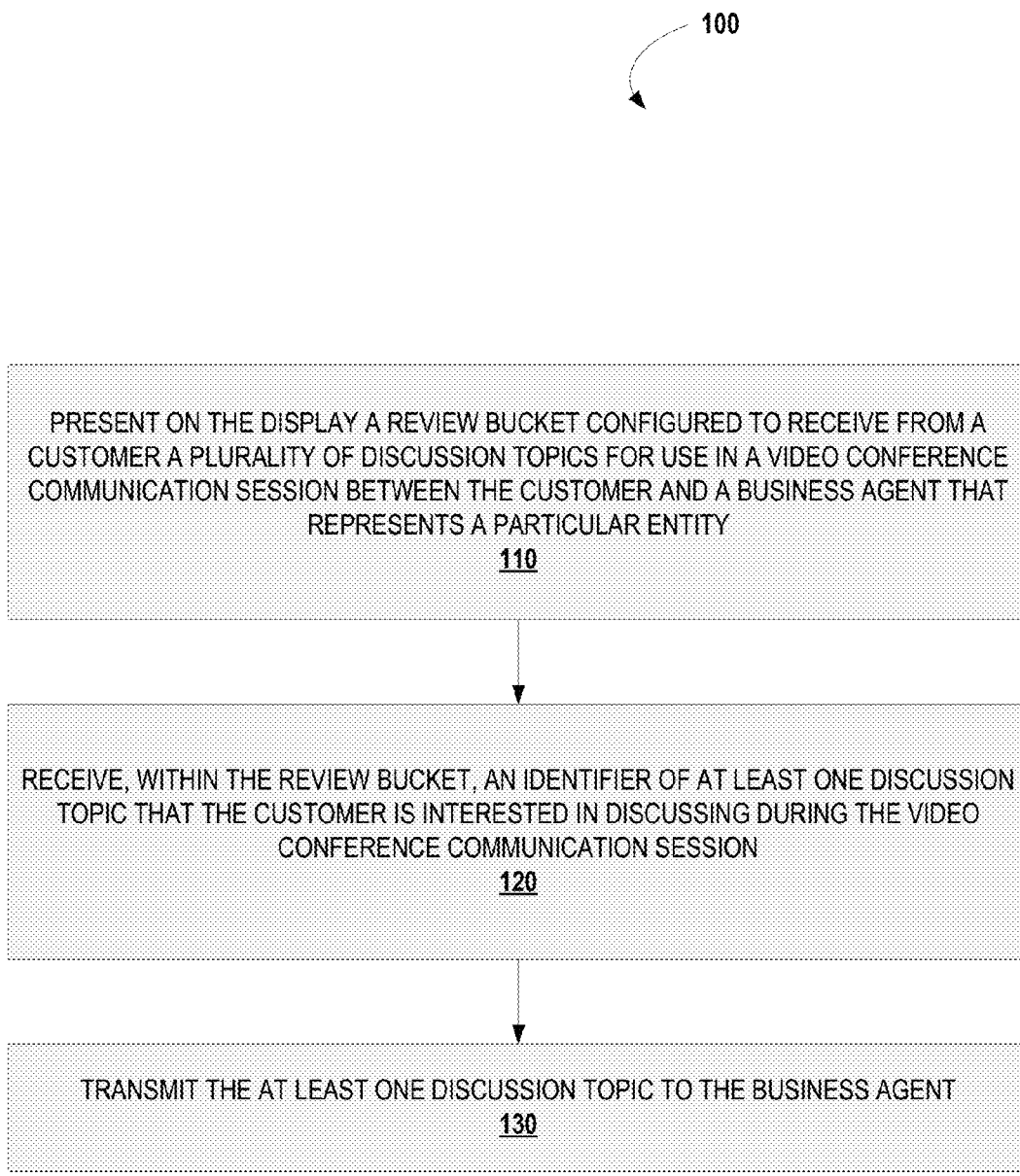
Figure 2:
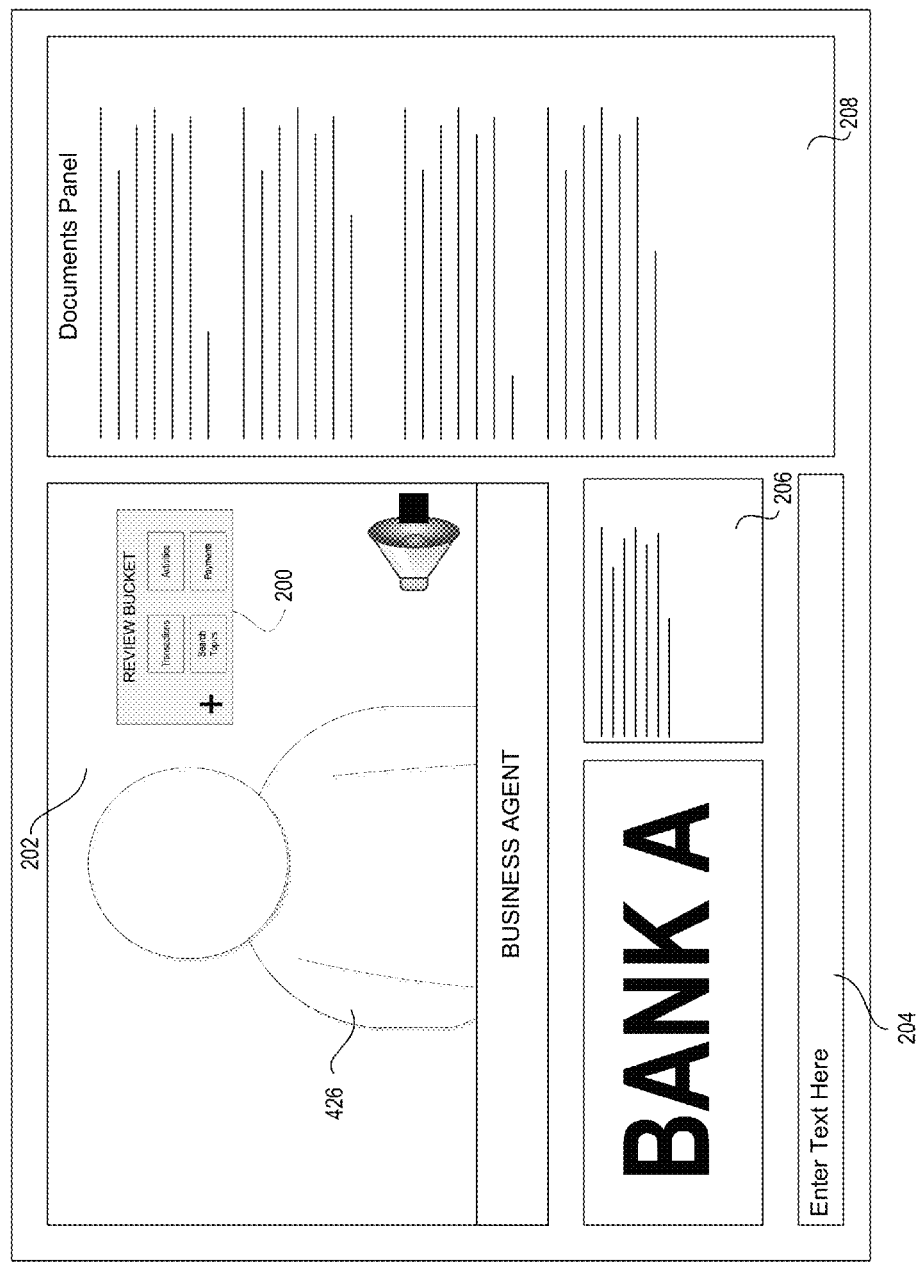
Figure 3:
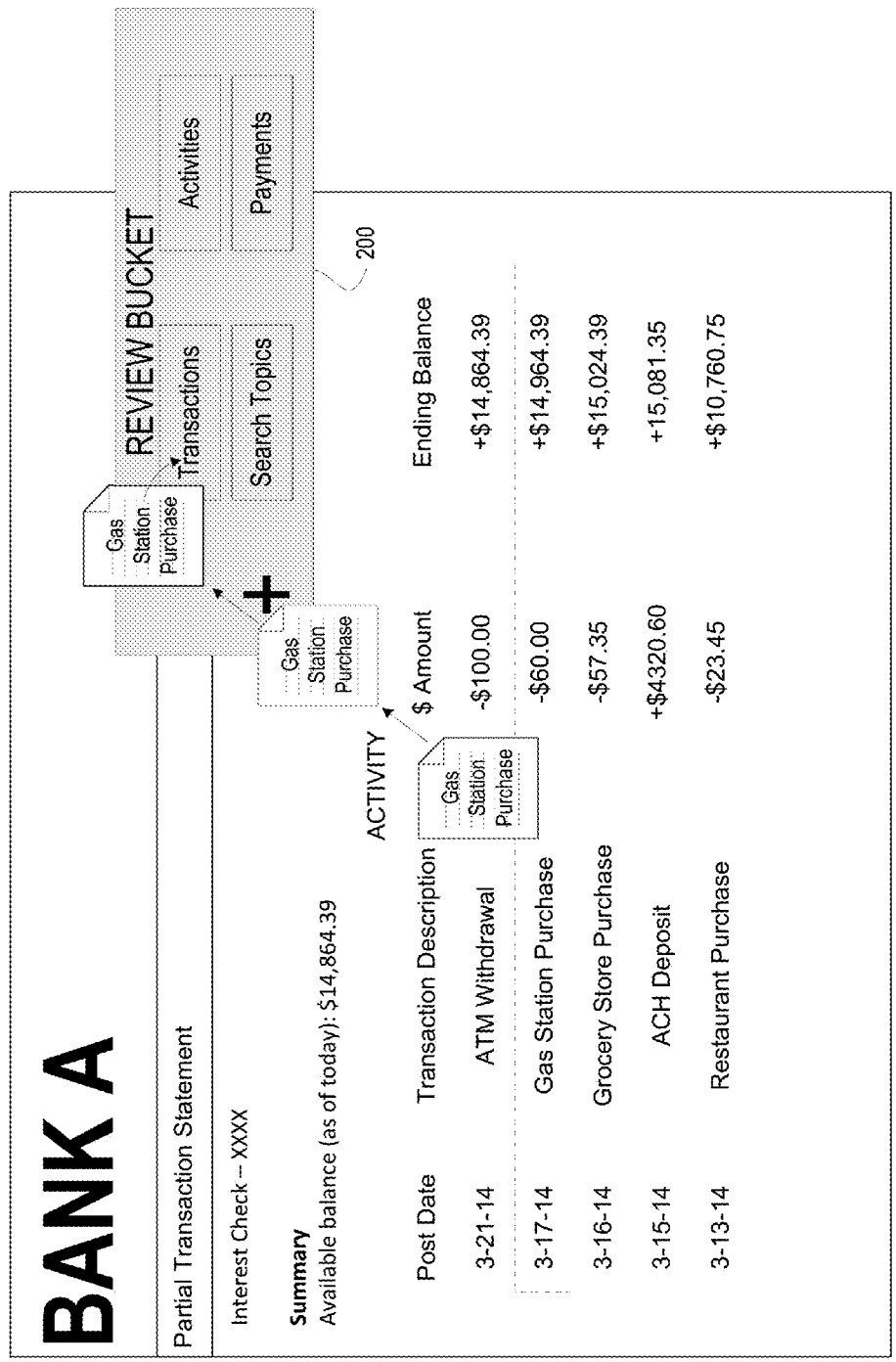
Figure 4:
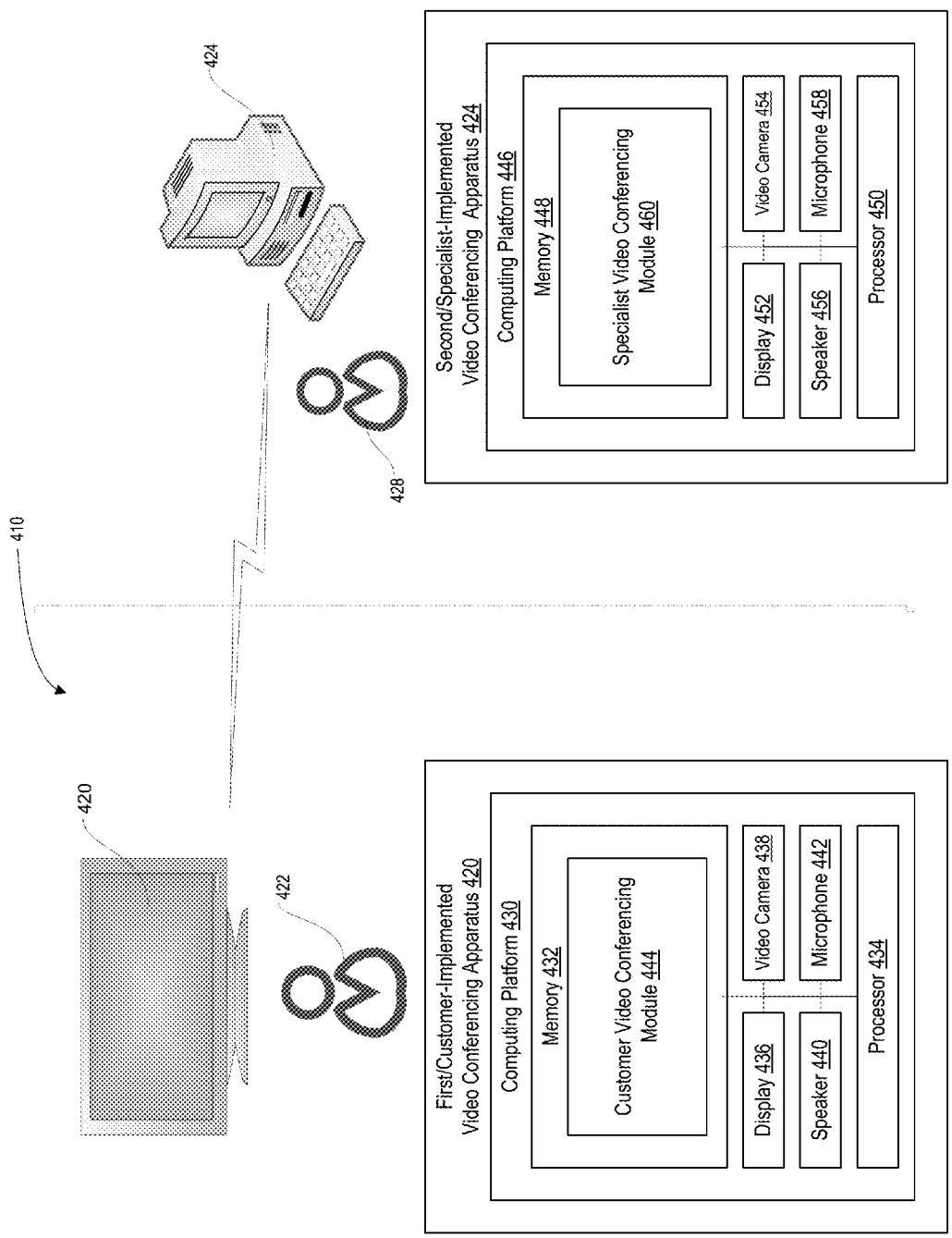
Figure 5:
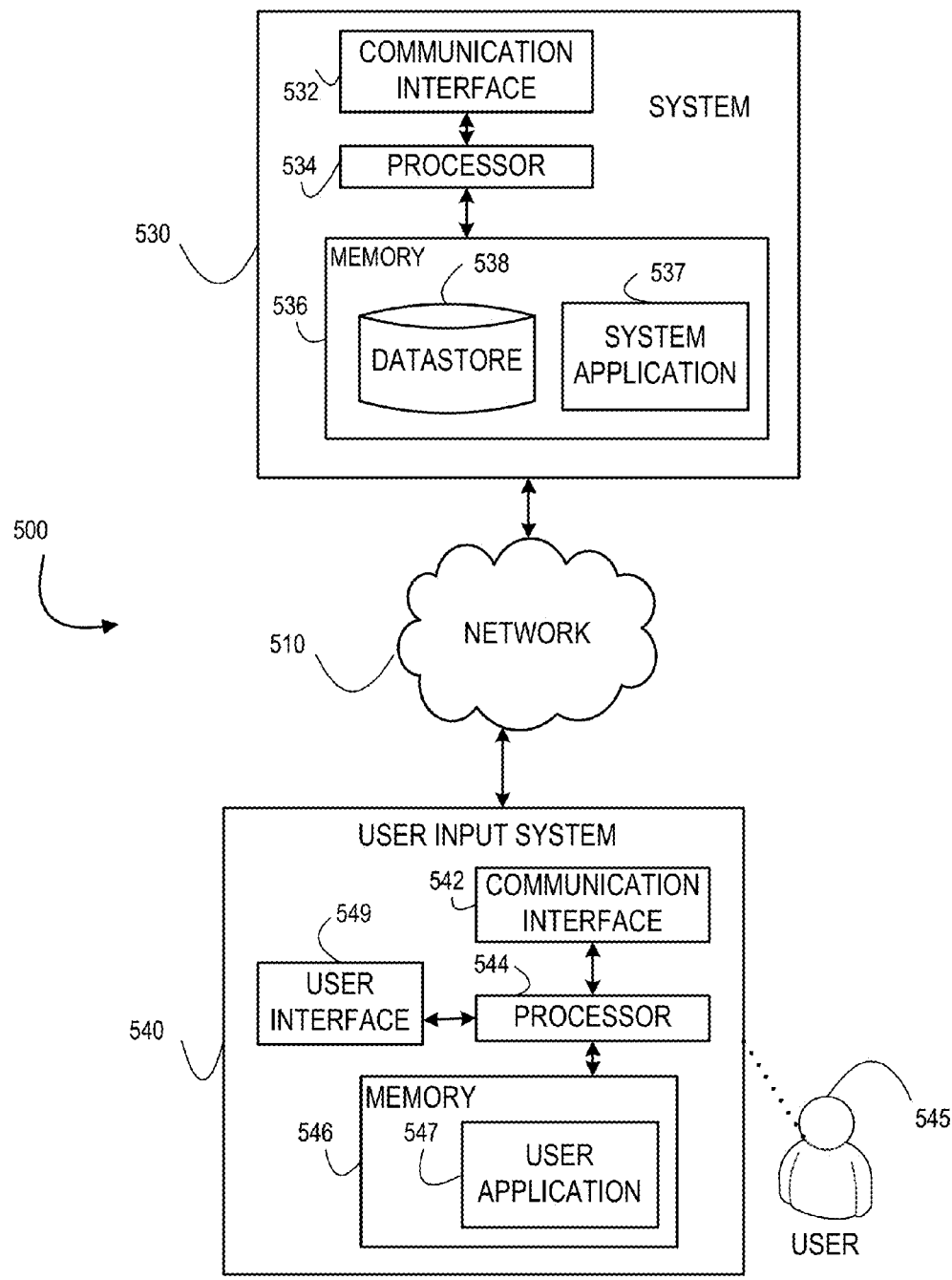

Having thus described embodiments of the invention in general terms, reference will now be made the accompanying drawings, wherein:

FIG. 1 is a flow diagram illustrating a general process flow for providing a review bucket for use in video conferences, in accordance with an embodiment of the invention;

FIG. 2 is a schematic illustrating a review bucket in conjunction with a video conference apparatus display, in accordance with an embodiment of the invention;

FIG. 3 is a schematic illustrating a review bucket, in accordance with an embodiment of the invention;

FIG. 4 is a schematic and block diagram of a system configured for providing a review bucket for use in video conferences, in accordance with an embodiment of the invention; and FIG. 5 is an exemplary system diagram configured for providing a review bucket for use in video conferences, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

Embodiments of the invention are directed to systems, methods and computer program products for providing a review bucket. The invention enables a customer to utilize a review bucket application or tool, in conjunction with a video conference session, to easily provide a business agent on the call with information and discussion topics that the customer is interested in reviewing during the communication session. The customer may additionally utilize the review bucket tool to aggregate discussion topics when they are not in communication with the particular business, where the discussion topics may be saved and presented at a later time.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like.

In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution.

In some embodiments, the "user" may be a customer of a particular business entity (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function. As used herein the phrase "in response to" may refer to an action occurring as the result of another action.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. More specific examples (e.g., a non-exhaustive list) of the computer-readable medium include the following: a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

Computer program code/computer-readable instructions for carrying out operations of embodiments of the present invention may be written in an object oriented, scripted or unscripted programming language such as Java, Perl, Smalltalk, C++, SAS, SQL, Python, Objective C, and/or the like. However, the computer program code/computer-readable instructions for carrying out operations of the invention may also be written in conventional procedural programming languages, such as the "C" programming language or similar programming languages. The computer program code may alternatively or additionally be written in one or more multi-paradigm programming languages, such as, for example, F#.

Some embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the functions/acts specified in the flowchart and/or block diagram block or blocks.

These computer program instructions may also be stored in a computer-readable medium (e.g., a memory, etc.) that can direct, instruct, and/or cause a computer and/or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Review Bucket Tool

Referring now to FIG. 1, a general process flow 100 is provided for providing a review bucket tool, widget, user-interface, and/or application for use in video conference communication sessions. In some embodiments, the process flow 100 is performed by a system (i.e., one or more apparatuses) having hardware and/or software configured to perform one or more portions of the process flow 100. In such embodiments, as represented by block 110, the system is configured to present on the display a review bucket widget configured to receive from a customer a plurality of discussion topics for use in a video conference communication session between the customer and a business agent that represents a particular entity. As represented by block 120, the system is also configured to receive, within the review bucket widget, an identifier of at least one discussion topic that the customer is interested in discussing during the video conference communication session. Lastly, as represented by block 130, the system is configured to transmit the at least one discussion topic to the business agent.

It will be understood that the system having the process flow 100 can include one or more separate and/or different apparatuses. For example, in some embodiments of the invention, a single apparatus (e.g., customer-implemented video conferencing apparatus 420 described in connection with FIG. 4) is configured to perform all of the portions of process flow 100 represented by blocks 110 to 130. However, in some other embodiments, a first apparatus (e.g., customer-implemented video conferencing apparatus 420 described in connection with FIG. 4 is configured to perform the portions of process flow 100 represented by block and 110 and 120 and a second apparatus (e.g., agent-implemented video conferencing apparatus 424 described in connection with FIG. 4) is configured to perform the portions of process flow 100 represented by blocks 130.

The system may include a customer-implemented video conference apparatus that is located within a private setting (e.g. a business location or home of the customer), such that the customer can communicate and exchange private information with the system, and more specifically an agent associated with the business and interacting with the customer during the video conference session. In one specific example, the customer-implemented video conference apparatus may be located within an enclosed office space at a financial institution, such as a banking center. In addition, the customer-implemented video conference may include several integrated devices such as a display, a video camera, a speaker, and a microphone, all of which are configured to allow the user to communicate with and view the agent as well as documents presented during the video conference session. The customer-implemented video conference may operate a customer module that is configured to implement the display, the video camera, the speaker, and the microphone within the video conference system to conduct a video (and audio) communication session (e.g., a video chat session) with an agent that is located physically remote from the location at which the customer-implemented video conference is located. It should be noted that, as used herein, the term video conferencing apparatus may refer to the customer-implemented video conferencing apparatus and the agent-implemented video conferencing apparatus operating in conjunction with one another as such the customer-implemented video-conferencing apparatus may be configured to process functions described in conjunction with the video-conferencing apparatus and vice versa.

At block 110, the system presents a review bucket on the display of the customer-implemented video conference apparatus. The review bucket may be configured to receive a plurality of discussion topics for use in a video conference communication session between the customer and a business agent that represents a particular entity. The discussion topics may be related to or include search topics, transactions from transaction lists, activities from activity lists, payment assessments, and/or other information from within an online banking. In an embodiment where the review bucket is presented prior to the initiation of the video conference communication session, the review bucket may be presented on multiple devices of the customer. For example, although a customer may typically utilize their desktop computer as a means to facilitate video conference sessions, the review bucket may be presented on the customer's mobile phone prior to initiating the video conference session at the desktop computer. This feature gives the customer the ability to specify future discussion topics while they are on the go or without access to a stationary computing device or video conference apparatus.

The review bucket may be an electronic tool that is embodied by a widget, an application, a user-interface, or a combination of the aforementioned. In one embodiment, the review bucket may be a user-interface associated with an online banking site, video conference session, a web page, web browser, and the like. Alternatively, the review bucket may be a stand-alone application that is either provided by, or configured to communicate with, a particular business entity for the purpose of providing a customers preferred discussion topics to a business agent that represented the business and therefore communicates with the customer on behalf of the business.

In addition to being configured to communicate with a device, application, or apparatus that is external to the apparatus on which the review bucket is being presented to the customer (e.g. an agent-implemented video conferencing apparatus) for the purpose of transmitting potential discussion topics to the business, the review bucket may also be configured to communicate and/or be compatible with other applications within (or internal to) the customer-implemented video apparatus (or another computing device utilized by the customer) for the purpose receiving information from the various applications. In one embodiment, functions that are typically internal and/or restricted to a particular application may be extended to the review bucket as a result of the review bucket being configured to be compatible with the particular application and thus configured to communicate with the application. For example, the native drag-and-drop function of an email application may restrict the customer from being able to drag-and-drop line items to locations that are not within the email application (e.g. dragging and dropping a line item from the inbox to the deleted items). The review bucket may then be configured to be compatible with the email application such that the customer is able to drag-and-drop line items directly from the email application into the review bucket.

The review bucket is configured to be dynamically positioned about the display of the customer-implemented apparatus in various non-fixed orientations as opposed to being presented in a static or fixed position. The review bucket may follow the user from page to page and screen to screen as the customer navigates through documents, web pages, and/or account activity. After initial presentation of the review bucket on the customer-implemented apparatus display the review bucket may be rearranged by the customer in various non-fixed orientations. The customer may be able to select the review bucket and drag-and-drop the widget into any desired position on the display. In an embodiment, where the review bucket is initially presented during the video conference session, the initial position at which the tool is presented on the display may be defined by the business associated with the video conference session, the customer, or a third-party developer of the widget. For example, if the business is a financial institution that has a default template used to conduct their video conference sessions with customers, the financial institution may specify that the initial position of the tool should be specific location on the display that corresponds to an empty location on the template in which information is not otherwise displayed. In another example, the customer may have a personal visual preference for how they prefer to view documents, icons, widgets and the like on their computer screens or apparatus displays, the customer may then specify that the initial position of the tool should be specific location on the display according to their personal preference. The review bucket may then be automatically and/or manually repositioned throughout the video conference session either based on changes in the template or changes in the preference of the customer.

In some embodiments, in addition to automatically positioning or repositioning the review bucket on the display of the video conference apparatus, the system may be further configured to determine a level or percentage of transparency for the review bucket based on the position of the review bucket. For example, if important information is being presented on the display and the review bucket is overlapping or positioned on top of the information, the system may be configured to determine that the review bucket is obstructing the view of important information that the customer needs to read, and automatically determine to increase the transparency of the review bucket thus allowing the customer to view the information without the need of repositioning the review bucket. Alternatively, if the important information is removed throughout the session or the review bucket is no longer positioned on top of any information within the display, the system may be configured to determine that a currently transparent review bucket is no longer obstructing the view of important information that the customer needs to see, and automatically determine to decrease the transparency of the review bucket thus allowing the customer to more easily view the options, features, or information presented within the review bucket.

In some embodiments, in addition to automatically positioning or repositioning the review bucket on the display of the video conference apparatus, the system may be further configured to determine whether or not to minimize the review bucket based on the position of the review bucket, the status of the communication session (e.g. in queue, connected, on-hold, transferring, etc), or the location of content being displayed on the display. For example, if important information is being presented on the display and the review bucket is overlapping or positioned on top of the information, the system may be configured to determine that the review bucket is obstructing the view of important information that the customer needs to read, and automatically determine to minimize the review bucket while the information is being presented. Alternatively, if the important information is removed throughout the session or the review bucket is no longer positioned on top of any information within the display, the system may be configured to determine that a currently minimized call indicator widget is no longer obstructing the view of important information that the customer needs to see, and automatically determine to maximize the review bucket on the display thus allowing the customer to more easily view the options, features, or information presented within the call indicator widget.

The review bucket may further comprise an on/off mode. When turned "on", the system may be configured to determine to present the review bucket on the display. Likewise, when turned "off" the system may be configured to determine to not present the review bucket on the display. The review bucket may be placed in either on or off mode at any time before, during, or after the video conference session based on input or user preferences from the customer or the business agent, the type of communication session initiated between the customer and the business agent, one or more business rules or the like.

In one embodiment, the review bucket is presented on the display of the video conferencing apparatus (or another apparatus of the customer) prior to the communication session being initiated between the customer and the business agent or transmitting an indication that the customer requires communication with the business agent. In such an embodiment, the review bucket may be embodied by an application that is downloaded to an apparatus of the customer such that the review bucket is configured to receive identifiers of discussion topics on an on-going basis and transmit discussion topics in response to a communication session being initiated between the customer and the business agent. As such, information within the review bucket may be locally stored in the memory of apparatus on which the review bucket is being presented until the initiation of a communication session between the customer and the business agent.

In a second embodiment, the review bucket is presented on the display of the video conferencing apparatus (or another apparatus of the customer) in response to transmitting an indication that a customer requires communication with a business agent that is remotely located from the customer. In such an embodiment, the review bucket may be embodied by an application that is associated with an online banking application or video conferencing application and temporarily presented on the apparatus of the customer. While the customer is waiting within a queue to be connected to a business agent, the customer may add discussion topics of interest to the review bucket, upon connection the discussion topics may then be transmitted to the connected agent.

In a third embodiment, the review bucket is presented on the display of the video conferencing apparatus (or another apparatus of the customer) in response to initiating a video conference communication session between the customer and the business agent. In such an embodiment, the review bucket may be embodied by an application that is associated with an online banking application or video conferencing application and temporarily presented on the apparatus of the customer. The customer may then add discussion topics of interest to the review bucket on an ongoing basis throughout the video communication session such that the topics are immediately or periodically transmitted to the business agent, throughout the communication session, upon being added to the review bucket.

At blocks 120, after presenting the review bucket on the display of the video conferencing apparatus, the system may receive, within the review bucket widget, an identifier of at least one discussion topic that the customer is interested in discussing during the video conference communication session. As discussed herein, the phrases "receiving an identifier of a discussion topic" and "receiving a discussion topic" may be used interchangeably throughout the specification. Information such as an identifier of at least one discussion topic of interest to the customer may be received with the review bucket through various methods and/or a combination of one or more methods. In an exemplary embodiment, the customer is able to drag and drop information related to the discussion topic (e.g. search topics, transactions from transaction lists, activities from activity lists, payment assessments, emails, document, and/or other information from within an online banking) into the review bucket, where the information or more specifically the content of the files or documents may serve as an identifier of the discussion topic. For example, if the customer wants to dispute a particular transaction, the customer is able to locate the transaction in a transaction list or electronic statement within their online banking account and drag and drop a line item corresponding to the transaction into the review bucket to future discussion or dispute.

Other methods for receiving identifiers of discussion topics may include, but not be limited to, text input, voice command, sharing features, and the like. In an embodiment where a sharing feature is utilized to receive identifiers of discussion topics within the review bucket, the customer is able to share information with the review bucket. For example, if a customer is visiting a particular web page related to a discussion topic of interest, the customer may have the option to share the web page via email, text message links, social network, or directly to the review bucket. In such an embodiment, the information within the web page may be automatically sent to the review bucket in response to the customer selecting the option to share the web page with the review bucket. In this way, the review bucket may comprise internal contact information stored on the back end of the system that allows it to receive information from external sources. For example, the review bucket may have an assigned email address, virtual telephone number, instant messaging screen name, social networking handle, or the like, such that information can be received with in the review bucket through various means of data transmission.

In one embodiment, receiving an identifier of at least one discussion topic further comprises saving and/or storing a reference to the received identifier. The reference may include a screenshot of a web page or device display, a Hypertext Markup Language ("HTML") link, a document name, document location, and/or the like. For example, if the received identifier is a web page related to the potential discussion topic, in response to dragging and dropping the web page into the review bucket, the system may automatically screen shot the web page and additionally save a link to the web page address for later use by the business agent when reviewing the review bucket discussion topics.

The system may additionally save and/or store metadata for each received identifier. The metadata may be automatically generated by the system when the identifier is received, alternatively received by an external application, or derived from a combination of the two previously mentioned methods. As such, the metadata may include information such as the date on which the identifier was received within the review bucket, the time at which the identifier was received within the review bucket, machine information of the device used to add the identifier to the review bucket, and the like. In some embodiments, the metadata of a particular identifier may be used by the system to automatically categorize discussion topics or assign priority to the potential discussion topics. For example, the system may utilize optical character recognition ("OCR") to identity a category related to the discussion topic and assign the discussion topic to the particular category. In a specific example, the customer may drop a particular transaction into the review bucket, and the system may identify that the received identifier is related to a transaction and automatically categorize the discussion topic under the "transaction activity" category. In another example, the customer may add a plurality of identifiers to the review bucket, and the system may automatically assign the priority of the related discussion topics based on the chronological order in which the associated identifiers were received, where the order in which the identifiers were received may be determined based on the date and/or time metadata assigned to the identifier (e.g. identifiers with less recent dates and times may have a higher priority ranking than identifiers with more recent dates and times.

In other embodiments, the customer may manually categorize discussion topics or assign priority to the potential discussion topics through a direct interaction with the review bucket using the apparatus on which the review bucket is being presented. In one embodiment, the review bucket may additionally comprise one or more bucket labels that correspond to different discussion topic categories or discussion topic priority rankings. The customer may then add the discussion topic or drag the identifier to the appropriate bucket such that upon receiving the discussion topic identifier the system is automatically aware of the customers category and/or priority reference. In a second embodiment, the customer may provide user input into the review bucket that specifies the name of a category in which the discussion topic should be added, or a priority ranking (e.g. numeric ranking, urgency ranking, and the like) in which the discussion topic should be associated with. In another embodiment, the customer may reorder a list of discussion topics that have been received within the review bucket, where discussion topics at the top of the list have a higher priority over discussion topics at the bottom of the list. For example, the list may be reordered by the customer dragging and dropping the discussion topics into a preferred position within the list or by the customer assigning each topic a priority number such that in response to receiving the input from the customer the system may determine an appropriate priority ranking for each of the discussion topics based on the customers user input.

In other embodiments, the system may categorize discussion topics or assign priority to the potential discussion topics independent of the use of metadata or customized user input from the customer. It should be noted that although methods for categorizing discussion topics are discussed individually herein, any combination of methods may be used in categorizing or assigning priority to a discussion topic. In one embodiment, the discussion topics may be prioritized based on the number of time or frequency that they have been added to the review bucket. In this way discussion topics may be prioritized at an individual level or cumulatively prioritized at a categorical level. For example, on a categorical level, if the customer has added five (5) discussion topics to the review bucket that are related to loan offers and two (2) discussion topics to the review bucket that are related to transaction activity, the system may automatically assign the loan offer category a higher priority than the transaction activity category. In another example, on an individual level, if the customer has added a first discussion topic to the review bucket once and has added a second discussion topic to the review bucket twice, the system may automatically assign the second discussion topic a higher priority than the first discussion topic such that the priority of an individual discussion topic is automatically increased based on the discussion topic being added to the review bucket multiple times.

As such, in some embodiments receiving identifiers within the review bucket or a review bucket category further comprises assigning the received discussion topic or category a numerical count indicating how many times the discussion topic has been added to the review bucket or indicating how many items are within a discussion topic category. In some, instances a user may accidentally add a discussion topic to the review bucket more than once. In such an instance, the system may be configured to detect that the discussion topic is a duplicate of a discussion topic that was previously added within the review bucket, and prompt the customer to specify whether or not the duplicated discussion topic was accidentally or purposely added by the customer prior to receiving the discussion topic within the review bucket. For example, if the customer specifies through user input that the topic was accidentally added, the system may discard and/or delete the discussion topic from the review bucket, otherwise if the customer specifies through user input that the topic was purposely added, the system may proceed to receive the discussion topic and add it within the review bucket. In some embodiment, the business may define a maximum number of discussion topics that can be added to the review bucket. In this way, the system may display a cumulative numerical count for the number of items within the bucket such that the system may alter the color of the numerical count (e.g. turn the number yellow) to indicate that the customer is approaching the maximum number of allowable discussion topics, if the customer has reached the maximum the system may alter the color of the numerical count (e.g. turn the number red) to indicate that the customer has reached the maximum number of allowable discussion topics and cannot add additional topics without first removing and/or deleting a topic from the review bucket. In other embodiment, the system may not display the cumulative numerical count for the number of items within the bucket, but automatically provide a warning message when the customer has reached the maximum number of allowable discussion topics.

In one embodiment, receiving identifiers within the review bucket further comprises prompting the customer to add a description of the received discussion topic. In this way, in addition to providing the business agent with a list of discussion topics the customer may be able to further specify their reasons for adding the discussion topics to the review bucket. For example, the customer may specify that they want to dispute a transaction, apply to open a new account, check the status of a request, and the like. The description may be added and received by prompting the customer to select a description for a list of choices presented in a drop down menu, or the customer may provide an open-ended description through user input into a presented text box within the review bucket tool.

In one embodiment, receiving identifiers within the review bucket further comprises generating a cumulative list of discussion topics that have been received within the review bucket. In one embodiment, the list may be saved by the system and used as a historical reference of discussion topics that the customer has added to the review bucket. In another embodiment, the list may be saved by the system and subsequently transmitted to the appropriate business agent during or before a communication session with the customer. In response to the customer hovering their mouse over the review bucket the system may display the cumulative list or the topics that are currently within the review bucket such that the customer is able to remove topics, categorize topics, assign priority, and the like.

At blocks 130, after receiving an identifier of at least one discussion topic that the customer is interested in discussing during the video conference communication session, the system may transmit the at least one discussion topic to the business. In some embodiments, the discussion topic is transmitted directly to an appropriate business agent. In other embodiments, the discussion topic is transmitted to a remote server and stored by the business until a communication session is initiated with the customer and the discussion topics are needed. The system may transmit discussion topics individually, cumulatively, based on categories, and the like. For example, the system may transmit to the business agent a cumulative list that contains all the discussion topics that have been received within the review bucket Information (e.g. discussions topics or identifiers) may be transmitted using various methods, including but not limited to, email, internal messaging, display replication, and the like).

In one embodiment, the at least one discussion topic is immediately transmitted to the business agent after being received within the review bucket. In such an embodiment, the review bucket may be presented on the display of the video conferencing apparatus during a current video conferencing session such that information is received by the review bucket and transmitted to the business agent in real time during the video call. In one instance, transmitting the at least one discussion topic to the business agent comprises the system being configured to present a replication of the review bucket on the display of the agent-implemented apparatus such that both the customer and the agent review buckets are synced with one another, and both the customer and the agent are able to view and edit (in real time) discussion topics within the review bucket. For example, the business agent can remove a topic from the review bucket after it has been discussed and the customer is able to see the topic being removed. Additionally, the customer can reorder the priority of topics or delete discussion topics within the review bucket and the business agent can view which topic is of new importance to the customer (or no longer important in an instance where the customer deletes a discussion topic) as the communication session is ongoing. In another embodiment, a current communication session may not exist between the customer and the business agent, but the discussion topic may be immediately transmitted to a remote server and stored by the business, upon being received, until a communication session is initiated with the customer and the discussion topics are needed. The discussion topics may then be retrieved from the remote server by the agent-implemented video conferencing apparatus, at a later time when the discussion topics are needed.

In another embodiment, the at least one discussion topic is periodically transmitted to the business agent after being received within the review bucket. In such an embodiment, the review bucket may be presented on the display of the video conferencing apparatus during a current video conferencing session such that information is received by the review bucket and periodically transmitted to the agent-implemented video conferencing apparatus in response to the business agent requesting a new topic for discussion. In this way, discussion topics may be removed from the customers review bucket as they are being transmitted to the business agent upon request. In another embodiment, a current communication session may not exist between the customer and the business agent, but the discussion topic may be periodically transmitted to a remote server and stored by the business, upon being received, until a communication session is initiated with the customer and the discussion topics are needed. The discussion topics may be periodically transmitted from the review bucket at regularly scheduled intervals (e.g. a number of seconds, minutes, days, weeks, and the like) as defined by either the customers preferences, business rules, or rules of a third party developer of the review bucket tool.

In another embodiment, the at least one discussion topic is a question that the user needs an answer to. In such an embodiment, the review bucket may be presented on the display of the video conferencing apparatus during a current video conferencing session such that the question is received by the review bucket and in response to receiving the question the business agent can provide answers. In one embodiment, the answers to the received questions are communicated back to the review bucket in the form of a file such that a link to the file may be provided within the review bucket. For example, the customer can provide multiple questions within the review bucket and a link to the file comprising the answers to the questions may be accessible through the review bucket. In one embodiment, the review bucket may comprise a subcategory for question answers such that in response to selecting the subcategory a historical list of links to answers of all the questions that the customer has ever asked may be provided. In another embodiment, the answers to the received questions are communicated back to the customer via the online banking platform. For example, the customer can provide multiple questions within the review bucket and a log file comprising the answers to all the questions that the customer has ever asked may be loaded, saved, and presented within the customers online banking account. Specific file links or log files within historical list of question answers may be archived, deleted by the customer or the business agent on an as needed basis. In one embodiment, the review bucket may comprise a self-service or "did you know" feature that automatically populates links to tutorials, example documents, or other tools in response to the user providing discussion topics within the review bucket, where the types of tutorials, example documents, or other tools may be based on the content or subject matter of the discussion topics that are provided within the review bucket.

In some embodiment, the review bucket comprises a scheduling feature such that the review bucket is configured to facilitate and/or communicate scheduling request on behalf of the customer. In such an embodiment, in addition to providing a discussion topic the customer may provide an appointment request by specifying or providing a time and/or date at which they want to establish a communication session with a business to discuss the discussion topic. In an embodiment where the customer specifies that they will establish the communication session, an appointment may be made on behalf of the customer. In an embodiment where the customer specifies that they want to be contacted by a business agent, an appointment may be made on behalf of the customer where the business agent initiates a communication session with the customer at the specific time and/or date specified in the appointment request.

In some embodiments, the review bucket is configured to operate in both an online or offline mode. The mode of operation may be determined based on customer preferences (e.g. the customer can specify whether the review bucket should be online or offline), based on the current network connection of the device on which the review bucket is being presented (e.g. the review bucket is online when connected to the internet and offline when disconnected to the internet), or determined by a combination of the two previously disclosed methods. For example, a customer may specify in their user preferences that the review bucket tool should operate in offline mode when the apparatus on which the review bucket is being presented is connected to a public network (e.g. local coffee shop) and operate in online mode when the apparatus on which the review bucket is being presented is connected to a private network (e.g. home wi-fi). The system may then determine whether or not to transmit data (e.g. discussion topics) from the review bucket based on whether or not the review bucket is operating in online or offline mode. When in either online or offline mode information/data included in the review bucket (e.g. discussion topics, identifiers, or metadata) may be save locally in the memory of the apparatus in which the review bucket is being presented until the review bucket is prepared to transmit the data. The discussion topics may additionally be saved in a queue for later transmission until the system determines that it is authorized or capable of transmitting data to the business.

In one embodiment, transmitting the at least one discussion topic to the business agent further comprises the system being configured to transmit information included in the identifier of the at least one discussion topic and import the information into the electronic version of a form, application, or the like. For example, the customer may be interested in being pre-approved for an automotive loan and interested in discussing potential payments and interest rates that the business is able to offer the customer. The customer may drop identifiers of various cars that the customer is interested in purchasing (e.g. a web page that contains the year, make, model, and price of the car) into the review bucket such that in response to transmitting the at least one discussion topic, the system may import the year, make, model, and price of the car into a form, loaded on the agent-implemented video conferencing apparatus, that automatically calculates potential payments for customers.

In one embodiment, the communication session between the business agent and the customer is initiated utilizing an automated dialer system in which the customer may be prompted to specify their reason for initiating the communication session by provided one or more voice or numeric commands. For example, the customer may be required to press "1" if they need to speak with a loan officer, or are calling to make a payment for an account. In such an embodiment, transmitting the at least one discussion topic comprises transmitting the discussion topic to an automated dialer system such that the customer is not required to specify a reason for contacting the business or initiating the communication session. The system may automatically determine the customer's reason for contacting the business or initiating the communication session based at least partially on the transmitted discussion topic. In some embodiments, the system may require the customer to confirm the determined reason of the customer for contacting the business prior to initiating the communication session between the customer and the appropriate business agent. In some embodiments, when a communication session is initiated the system may utilize information within the review bucket to determine how to route the customers communication session. In some embodiments, the information may comprise preferred or favorite business agents of the customer.

Method for Initiating a Video Conference Communication Session

The system may be additionally configured to transmit an indication that a customer requires communication with a business agent that is remotely located from the customer. The indication may be embodied as a request from the customer to initiate a video conference session between the customer and an agent of a particular business such as a financial institution. The request may be received from within a platform such as an online banking platform in which the indication may be transmitted directly from a server of financial institution to an agent-implemented video conference apparatus. For example, the customer may access their online banking account using various customer authentication credentials, after accessing the online banking account the customer may request (from within the online banking platform specifically associated with the customers bank account) to initiate a video conference session with an agent of the financial institution. The request may then be transmitted by an online banking server to the video conference apparatus of an agent that is qualified to handle the customer's request. In this way, the agent may receive a transmitted indication that a customer is attempting to connect with them via a video conference session.

It should be noted that although, in the embodiments discussed herein, the customers "request to communicate with a business agent" is implemented by a video conference session, the "request to communicate" may also refer to or include initiating a telephone call, a chatting window, email correspondence, and other forms of electronic communication not explicitly contemplated here. In this way, the video conference apparatus may refer to other computing devices such a mobile phones, landline telephones, laptop computers, desktop computers, computing tablets, and other devices configured to support various forms of electronic communication.

As such, the transmitted request or indication may comprise information relevant to establishing a network connection between an apparatus of the customer (e.g. customer-implemented video conference apparatus) and an apparatus of the agent (e.g. agent-implemented video conference apparatus). The information relevant to establishing a network connection between the apparatuses or devices of the agent and the customer may include but not be limited to machine identifying information (e.g. domain, name, IP address, and the like), email address, telephone number, video-conference system customer name, and the like). After receiving the required information, the system may establish a network connection between a video conference system and a mobile device of a customer. In an exemplary embodiment, the video conference system is maintained by an entity such as a financial institution and the customer has an account with the financial institution.

In some embodiments, the established network connection between the customer-implemented video conference apparatus and agent-implemented video conference apparatus facilitates a two-way communication system between the agent-implemented apparatus and the customer-implemented apparatus. Through the two-way communication system, the agent-implemented apparatus is configured to send and receive data to and from the customer-implemented apparatus, and the customer-implemented apparatus is configured to send and receive data to and from the agent-implemented apparatus. In some embodiments, information is sent from the customer-implemented apparatus and received at the agent-implemented apparatus in response to the agent-implemented apparatus sending a request for information/data to the customer's customer-implemented apparatus. For example, the specialist may request information from the customer-implemented apparatus that may aid in authenticating the customer's identity. The customer-implemented apparatus may then send the agent-implemented apparatus one or more customer authentication credentials in response to receiving the request. In some embodiments, information is sent from the agent-implemented apparatus and received at the customer-implemented apparatus in response to the customer-implemented apparatus sending a request for information/data. For example, the customer may use the customer-implemented apparatus, and more specifically the review bucket tool, to indicate a particular credit card application to be received from the agent-implemented apparatus, and more specifically the associated specialist. In response to the request, the specialist may then send the forms to the customer's customer-implemented apparatus via the agent-implemented apparatus. The forms may additionally be sent automatically based on other factors presented within the video conference session without a need for external input from either the customer or the specialist. In other embodiments, information may be exchanged between the agent-implemented apparatus the customer-implemented apparatus on a continuous and/or semi-continuous basis. For example, the agent-implemented apparatus and the customer-implemented apparatus may continuously exchange call/video log information related to the history of a video conference session that has been initiated between the agent-implemented apparatus and the customer-implemented apparatus. In this way, a record or log of the session and documents or information exchanged may be maintained on both the agent-implemented apparatus and the customer-implemented apparatus.

After transmitting an indication that a customer requires communication with a business agent that is remotely located from the customer, the system may then initiate a video conference communication session between the customer and the business agent. Initiating the video conference session comprises providing a multimedia interface between the agent and the customer such that the agent and the customer are provided with an audio and video feedback of one another. As shown in FIG. 2, the video conference session may allow the user to communicate and/or view a business agent via a video and/or audio feed 202 presented on a display within the video conference apparatus. As further illustrated in FIG. 2, through the display or other applications provided on the display (e.g. review bucket tool), the user may have access to a range of functions including chatting capabilities through text input boxes 204 and dialogue boxes 206, the ability to review information presented by the specialist via document presentation panels 208, and the ability to transmit discussion topics to the business agent throughout the video conference communication session utilizing the review bucket tool 200.

In some embodiments, initiating a video conference session between an agent of the business and the customer may further comprise authenticating the customer's identity prior to initiating the session. However, in other embodiments, if the request to communicate with the agent was received from within a previously authenticated platform (e.g. from within the online banking platform), the authentication step may not be necessary or a less stringent form of authentication may be used. In an exemplary embodiment, the authentication is based at least partially on customer input or general information that verifies that customer is an account holder of the financial institution. The customer input or general information may be received from the customer-implemented apparatus via the established network connection. The customer input or general information may typically comprise one or more authentication credential associated with the customer. The requested and/or received authentication credentials may vary based on the type of video conference session being initiated, and more specifically the type of transactions that the customer may complete (or is expected to complete) throughout the session. In some embodiments, the system may determine the types of transactions that that the customer is going to complete during the call by retrieving and analyzing the discussion topics provided within the review bucket. In this way, numerous types and levels of customer authentication may exist, and the customer may be initially authenticated for a primary level of access to conduct general transactions within the video conference session, and the customer may be required to provide a subsequent stricter authentication in an instance where a need exist to conduct a transaction that is not provided within the primary level of access received. For example, the primary level of access may include the customer being able to verify that they are an account holder with the entity (e.g. financial institution) by providing an account number and related password such that the customer is able to interface with an agent and ask questions about loan options that the financial institution offers. In an event that the customer decides to apply for a loan while within the video conference session, the customer may be required to provide additional authentication credentials, such as a social security number, prior to being sent a loan application form. In some embodiment, the received authentication credentials may be used by the agent and/or the video conference system to prepare documents (e.g. a loan application) for use within the video conference session. The customer authentication credentials that may be sent via the customer-implemented apparatus may include, but not be limited to, a customer name, password, account number, full-length social security number or partial digits, challenge questions, familiar pictures and/or phrases, biometrics, key fob-based alphanumeric codes, and the like. In some embodiments, the customer authentication credentials are explicitly provided by the customer, and in other embodiments the customer authentication credentials are stored within the customer's customer-implemented apparatus and automatically transferred, in response to a request, to the video conference system on the customer's behalf.

In an alternate embodiment, the customer's identity is authenticated prior to establishing a secured network connection. In such an embodiment, the system may first establish a general and/or unsecured network connection with the customer-implemented apparatus solely for the purpose of authenticating the customer's identity. Information transmitted through the unsecured network connection, such as sensitive customer information maintained within customer authentication credentials, may be required to be encrypted prior to being sent from the customer-implemented apparatus to the video conference system. As such the customer-implemented apparatus may separately send a decryption key to the video conference system. After the customer has been authenticated and the customer's identity has been subsequently verified, the system may then establish a secure network connection between the video conference system and the customer-implemented apparatus of the customer such that sensitive information (e.g. customer financial data) may be transmitted through the secured without requiring encryption prior to being sent.

Review Bucket Tool System and Environment

Referring to FIG. 4, a combination schematic and block diagram is presented of a system 410 for implementing a review bucket, in accordance with an embodiment of the invention. The system 410 includes a first or customer-implemented video conferencing apparatus 420 that is located within a private setting, such that the customer 422 can communicate and exchange private information with a business agent 426 through designated communication devices. In one specific example, the customer-implemented video conference apparatus 420 may be located within the customer's home. The customer-implemented video conferencing apparatus 420 includes a computing platform 430 having a memory 432 and a processor 34 in communication with memory 432. In addition, customer-implemented video conferencing apparatus 20 includes a display 436, a video camera 438, a speaker 440 and a microphone 442, all of which are in communication with the processor 434 and may be embodied in hardware and/or software. The video conferencing apparatus 420 may include more than one device, such as dedicated, stationary video conferencing devices or the video conferencing apparatus 420 may be a single device, such as a mobile device (i.e., computing tablet or the like). The memory 432 of video conferencing apparatus 420 stores customer video conferencing module 44 that is configured to implement the display 436, the video camera 438, the speaker 440 and the microphone 442 to conduct a video (and audio) communication session (i.e., a video chat session) with a business agent 426 that is located physically remote from the business location at which the first/customer-implemented video conferencing apparatus 420 is located.

The customer-implemented video-conferencing apparatus 420 is in network 412 communication (wired, wireless or a combination thereof) with a second or agent-implemented video conferencing apparatus 424. Agent-implemented video conferencing apparatus 424 may be any communication device that facilitates audio and video communication, such as personal computer (PC), laptop computer, mobile computing device (e.g., tablet device, mobile/cellular telephone) or the like. The agent-implemented video conferencing apparatus 424 includes a computing platform 446 having a memory 448 and a processor 450 in communication with memory 448. In addition, second video conferencing apparatus 424 includes a display 452, a video camera 454, a speaker 456 and a microphone 458, all of which are in communication with the processor 450 and may be embodied in hardware and/or software. The memory 448 of second/agent-implemented video conferencing apparatus 424 stores agent video conferencing module 460 that is configured to implement the display 452, the video camera 454, the speaker 456 and the microphone 458 to conduct a video (and audio) communication session (i.e., a video chat session) with a customer 422 that is located at the customer-implemented video conferencing apparatus 420.

FIG. 5 is an exemplary block diagram illustrating technical components of a system 500 for implementing a review bucket as described in the process flow described in FIG. 1. As illustrated, the system environment 500 includes a network 510, a system 530, and a user input system 540. Also shown in FIG. 5 is a user 545 of the user input system 540. The user input system 540 may be any computing device. The user 545 may be a person who uses the user input system 540 to execute a user application 547. The user application 547 may be an application to communicate with the system 530, perform a transaction, input information onto a user interface presented on the user input system 540, or the like. The user application 547 and/or the system application 537 may incorporate one or more parts of any process flow described herein.

As shown in FIG. 5, the system 530, and the user input system 540 are each operatively and selectively connected to the network 510, which may include one or more separate networks. In addition, the network 510 may include a telecommunication network, local area network (LAN), a wide area network (WAN), and/or a global area network (GAN), such as the Internet. It will also be understood that the network 510 is secure and may also include wireless and/or wireline and/or optical interconnection technology.

The user input system 540 may include any computerized apparatus that can be configured to perform any one or more of the functions of the user input system 540 described and/or contemplated herein. For example, the user 545 may use the user input system 540 to transmit and/or receive information or commands to and from the system 530. In some embodiments, for example, the user input system 540 may include a personal computer system (e.g. a non-mobile or non-portable computing system, or the like), a mobile computing device, a personal digital assistant, a mobile phone, a tablet computing device, a network device, a wearable computing device, a sensor, and/or the like. As illustrated in FIG. 5, in accordance with some embodiments of the present invention, the user input system 540 includes a communication interface 542, a processor 544, a memory 546 having a user application 547 stored therein, and a user interface 549. In such embodiments, the communication interface 542 is operatively and selectively connected to the processor 544, which is operatively and selectively connected to the user interface 549 and the memory 546. In some embodiments, the user 545 may use the user application 547 to execute processes described with respect to the process flow and interfaces described herein. Specifically, the user application 547 executes the process flow described in FIG. 1.

Each communication interface described herein, including the communication interface 542, generally includes hardware, and, in some instances, software, that enables the user input system 540, to transport, send, receive, and/or otherwise communicate information to and/or from the communication interface of one or more other systems on the network 510. For example, the communication interface 542 of the user input system 540 may include a wireless transceiver, modem, server, electrical connection, and/or other electronic device that operatively connects the user input system 540 to another system such as the system 530. The wireless transceiver may include a radio circuit to enable wireless transmission and reception of information. Each processor described herein, including the processor 544, generally includes circuitry for implementing the audio, visual, and/or logic functions of the user input system 540. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 547 of the memory 546 of the user input system 540.

Each memory device described herein, including the memory 546 for storing the user application 547 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 5, the memory 546 includes the user application 547. In some embodiments, the user application 547 includes an interface for communicating with, navigating, controlling, configuring, and/or using the user input system 540. In some embodiments, the user application 547 includes computer-executable program code portions for instructing the processor 544 to perform one or more of the functions of the user application 547 described and/or contemplated herein. In some embodiments, the user application 547 may include and/or use one or more network and/or system communication protocols.

Also shown in FIG. 5 is the user interface 549. In some embodiments, the user interface 549 includes one or more output devices, such as a display and/or speaker, for presenting information to the user 545. In some embodiments, the user interface 549 includes one or more input devices, such as one or more buttons, keys, dials, levers, directional pads, joysticks, accelerometers, controllers, touchpads, touchscreens, haptic interfaces, microphones, scanners, motion detectors, cameras, and/or the like for receiving information from the user 545. In some embodiments, the user interface 549 includes the input and display devices of a mobile device, which are operable to receive and display information.

FIG. 5 also illustrates a system 530, in accordance with an embodiment of the present invention. The system 530 may refer to the "apparatus" described herein. The system 530 may include any computerized apparatus that can be configured to perform any one or more of the functions of the system 530 described and/or contemplated herein. In accordance with some embodiments, for example, the system 530 may include a computer network, an engine, a platform, a server, a database system, a front end system, a back end system, a personal computer system, and/or the like. Therefore, the system 530 may be a server managed by the entity. The system 530 may be located at the facility associated with the entity or remotely from the facility associated with the entity. In some embodiments, such as the one illustrated in FIG. 10, the system 530 includes a communication interface 532, a processor 534, and a memory 536, which includes a system application 537 and a datastore 538 stored therein. As shown, the communication interface 532 is operatively and selectively connected to the processor 534, which is operatively and selectively connected to the memory 536.

It will be understood that the system application 537 may be configured to implement any one or more portions of the various user interfaces and/or process flow described herein. The system application 537 may interact with the user application 547. It will also be understood that, in some embodiments, the memory includes other applications. It will also be understood that, in some embodiments, the system application 537 is configured to communicate with the datastore 538, the user input system 540, or the like.

It will be further understood that, in some embodiments, the system application 537 includes computer-executable program code portions for instructing the processor 534 to perform any one or more of the functions of the system application 537 described and/or contemplated herein. In some embodiments, the system application 537 may include and/or use one or more network and/or system communication protocols.

In addition to the system application 537, the memory 536 also includes the datastore 538. As used herein, the datastore 538 may be one or more distinct and/or remote datastores. In some embodiments, the datastore 538 is not located within the system and is instead located remotely from the system. In some embodiments, the datastore 538 stores information or data described herein.

It will be understood that the datastore 538 may include any one or more storage devices, including, but not limited to, datastores, databases, and/or any of the other storage devices typically associated with a computer system. It will also be understood that the datastore 538 may store information in any known way, such as, for example, by using one or more computer codes and/or languages, alphanumeric character strings, data sets, figures, tables, charts, links, documents, and/or the like. Further, in some embodiments, the datastore 538 may include information associated with one or more applications, such as, for example, the system application 537. It will also be understood that, in some embodiments, the datastore 538 provides a substantially real-time representation of the information stored therein, so that, for example, when the processor 534 accesses the datastore 538, the information stored therein is current or substantially current.

It will be understood that the embodiment of the system environment illustrated in FIG. 5 is exemplary and that other embodiments may vary. As another example, in some embodiments, the system 530 includes more, less, or different components. As another example, in some embodiments, some or all of the portions of the system environment 500 may be combined into a single portion. Likewise, in some embodiments, some or all of the portions of the system 530 may be separated into two or more distinct portions.

In addition, the various portions of the system environment 500 may be maintained for and/or by the same or separate parties. It will also be understood that the system 530 may include and/or implement any embodiment of the present invention described and/or contemplated herein. For example, in some embodiments, the system 530 is configured to implement any one or more of the embodiments of the process flows described and/or contemplated herein in connection any process flow described herein. Additionally, the system 530 or the user input system 540 is configured to initiate presentation of any of the user interfaces described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing a discussion topic reviewing tool, the system comprising:
   a video conferencing apparatus including a processor, a memory, a first display in communication with the processor, a video camera in communication with the processor, a speaker in communication with the processor, and a microphone in communication with the processor; and
   a video conferencing module stored in the memory, comprising executable instructions that when executed by the processor cause the processor to:
   initiate presentation on the first display a review bucket configured to receive from a customer a plurality of discussion topics for use in a video conference communication session between the customer and a business agent that represents a particular entity;

receive from the customer, within the review bucket, an identifier associated with a first discussion topic that the customer is interested in discussing during the video conference communication session;

initiate transmission of the first discussion topic to the business agent via an agent-implemented apparatus, the agent-implemented apparatus comprising a second display;

initiate a video conference communication session between the customer and the business agent to discuss the first discussion topic transmitted to the business agent;

present the review bucket on the first display, wherein the review bucket is configured to be dynamically positioned about the first display in one or more non-fixed orientations by the customer, wherein the review bucket is configured to allow both the customer and the business agent to view, edit, reorder and remove discussion topics within the review bucket in real time;

present a replication of the review bucket on the second display;

receive from the customer during the video conference communication session, within the review bucket, one or more identifiers associated with one or more second discussion topics from the plurality of discussion topics; and place the one or more identifiers associated with the one or more second discussion topics in a video conference communication queue based on at least an order in which the one or more second discussion topics are received, wherein the order is determined by the customer.

2. The system of claim 1, wherein the review bucket is configured to be compatible with at least one application internal to the video conference apparatus such that the review bucket can communicate with the at least one application to (i) send information to the at least one application and (ii) receive information from the at least one application.

3. The system of claim 1, wherein the executable instructions when executed further cause the processor to initiate presentation of the review bucket prior to transmitting an indication that the customer requires communication with the business agent.

4. The system of claim 1, wherein the executable instructions when executed further cause the processor to initiate presentation of the review bucket in response to transmitting an indication that the customer requires communication with the business agent.

5. The system of claim 1, wherein the one or more identifiers associated with the one or more second discussion topics comprise contents of a file or a document added to the review bucket by the customer; and the executable instructions when executed further cause the processor to store a reference for the one or more identifiers associated with the one or more second discussion topics, and wherein the reference comprises at least one of a screenshot of a webpage, screenshot of the display, a Hypertext Markup Language ("HTML") link, a document name, or a document location.

6. The system of claim 1, wherein the executable instructions when executed further cause the processor to:

store metadata of the one or more identifiers of the one or more second discussion topics;

concurrently thereafter categorize the one or more second discussion topics based on the stored metadata of the one or more identifiers of the one or more second discussion topics; and concurrently thereafter assign a level of priority to the one or more second discussion topics based on the stored metadata of the one or more identifiers of the one or more second discussion topics.

7. The system of claim 1, wherein the executable instructions when executed further cause the processor to:

receive input from the customer that indicates (i) a category of the one or more second discussion topics and (ii) a level of priority of the one or more second discussion topics;

in response to receiving the input that indicates the category of the one or more second discussion topics, concurrently thereafter categorize the one or more second discussion topics based on the received input from the customer; and in response to receiving the input that indicates the level of priority of the one or more second discussion topics, concurrently thereafter assign the level of priority to the one or more second discussion topics based on the received information from the customer.

8. The system of claim 1, wherein the executable instructions when executed further cause the processor to, in response to receiving the one or more identifiers of the one or more second discussion topics, concurrently thereafter assign a level of priority to the one or more second discussion topics based on the number of times that the one or more second discussion topics were received within the review bucket.

9. The system of claim 1, wherein the executable instructions when executed further cause the processor to:

assign to the first discussion topic a numerical count indicating how many times the first discussion topic has been added to the review bucket;

based on the numerical count, detect that the first discussion topic is a duplicate of another first discussion topic within the review bucket;

prompt the customer to specify whether or not the first discussion topic was accidentally received within the review bucket; and in response to the customer specifying the first discussion topic was accidentally received within the review bucket, remove the first discussion topic from the review bucket.

10. The system of claim 1, wherein the executable instructions when executed further cause the processor to prompt the user to add a description of the first discussion topic.

11. The system of claim 1, wherein the executable instructions when executed further cause the processor to:

generate a cumulative list of discussion topics received within the review bucket; and transmit the cumulative list of discussion topics received within the review bucket to the business agent.

12. The system of claim 1, wherein the executable instructions when executed further cause the processor to:

determine whether the review bucket is operating in online mode or offline mode;

in response to determining the review bucket is operating in online mode, determine to transmit the first discussion topic to the business agent.

13. The system of claim 1, wherein the executable instructions when executed further cause the processor to:

determine whether the review bucket is operating in online mode or offline mode;

in response to determining the review bucket is operating in offline mode, determine to not transmit the first discussion topic to the business agent; and
save the first discussion topic in a queue for transmission at a later time.

14. The system of claim 1, wherein the executable instructions when executed further cause the processor to, in response to transmitting the first discussion topic, concurrently thereafter import information included in the identifier or the first discussion topic into an electronic form.

15. The system of claim 1, wherein a video conference communication session between the business agent and the customer is initiated utilizing an automated dialer system that requires the customer to specify a reason for initiating the video conference communication session, and wherein the executable instructions when executed further cause the processor to automatically determine the reason for initiating the video conference communication session based on the identifier of the first discussion topic.

16. The system of claim 1, wherein the executable instructions when executed further cause the processor to:
   transmit an indication that a customer requires communication with a business agent that is remotely located from the customer; and
   initiate a video conference communication session between the customer and the business agent, wherein initiating the video conference session comprises providing a multimedia interface between the agent and the customer that provides the agent and the customer with an audio and video feedback of one another.

17. A computer program product for providing a review bucket, the computer program product comprising:
   a non-transitory computer readable storage medium having computer readable program code embodied therewith, the computer readable program code comprising:
   a set of codes that when executed cause a computer to initiate presentation on a first display a review bucket widget configured to receive from a customer a plurality of discussion topics for use in a video conference communication session between the customer and a business agent that represents a particular entity;
   a set of codes that when executed cause a computer to receive from the customer, within the review bucket, an identifier associated with a first discussion topic that the customer is interested in discussing during the video conference communication session;
   a set of codes that when executed cause a computer to initiate transmission of the first discussion topic to the business agent via an agent-implemented apparatus, the agent-implemented apparatus comprising a second display;
   a set of codes that when executed cause a computer to initiate a video conference communication session between the customer and the business agent to discuss the first discussion topic transmitted to the business agent;
   a set of codes that when executed cause a computer to present the review bucket on the first display, wherein the review bucket is configured to be dynamically positioned about the first display in one or more non-fixed orientations by the customer, wherein the review bucket is configured to allow both the customer and the business agent to view, edit, reorder and remove discussion topics within the review bucket in real time;
   a set of codes that when executed cause a computer to present a replication of the review bucket on the second display;
   a set of codes that when executed cause a computer to receive from the customer during the video conference communication session, within the review bucket, one or more identifiers associated with one or more second discussion topics from the plurality of discussion topics; and
   a set of codes that when executed cause a computer to place the one or more identifiers associated with one or more second discussion topics in a video conference communication queue based on at least an order in which the one or more second discussion topics are received, wherein the order is determined by the customer.

18. The computer program product of claim 17, wherein the review bucket is configured to be compatible with at least one application internal to the video conference apparatus such that the review bucket can communicate with the at least one application to (i) send information to the at least one application and (ii) receive information from the at least one application.

19. A computer-implemented method for providing a review bucket for video conferences, the method comprising:
   initiating, by a video conferencing module executed by a processor, presentation on a first display a review bucket widget configured to receive from a customer a plurality of discussion topics for use in a video conference communication session between the customer and a business agent that represents a particular entity;
   receiving from the customer, by a video conferencing module executed by a processor, within the review bucket widget, an identifier associated with a first discussion topic that the customer is interested in discussing during the video conference communication session;
   initiating, by a video conferencing module executed by a processor, transmission the first discussion topic to the business agent via an agent-implemented apparatus, the agent-implemented apparatus comprising a second display;
   initiating, by a video conferencing module executed by a processor, a video conference communication session between the customer and the business agent to discuss the first discussion topic transmitted to the business agent;
   presenting, by a video conferencing module executed by a processor, the review bucket on the first display, wherein the review bucket is configured to be dynamically positioned about the first display in one or more non-fixed orientations by the customer, wherein the review bucket is configured to allow both the customer and the business agent to view, edit, reorder and remove discussion topics within the review bucket in real time;
   presenting, by a video conferencing module executed by a processor, a replication of the review bucket on the second display;
   receiving, by a video conferencing module executed by a processor, from the customer during the video conference communication session, within the review bucket, one or more identifiers associated with one or more second discussion topics from the plurality of discussion topics; and
   placing, by a video conferencing module executed by a processor, the one or more identifiers associated with the one or more second discussion topics in a video conference communication queue based on at least an order in which the one or more second discussion topics are received, wherein the order is determined by the customer.

20. The computer-implemented method of claim 19, wherein the review bucket is configured to be compatible with at least one application internal to the video conference apparatus such that the review bucket can communicate with the at least one application to (i) send information to the at least one application and (ii) receive information from the at least one application.

21. The system of claim 1, wherein the executable instructions when executed further cause the processor to determine a level of transparency for the review bucket based on the position of the review bucket by:

determining that the review bucket is obstructing information presented on the display;

automatically increasing the level of transparency for the review bucket to allow the customer to view the information;

determining that the review bucket is no longer obstructing the information; and automatically decreasing the level of transparency of the review bucket.

22. The system of claim 1, wherein the executable instructions when executed further cause the processor to:

transmit the first discussion topic to a remote server upon receiving the first discussion topic from the customer;

store the first discussion topic on the remote server; and retrieve the first discussion topic from the remote server before transmitting the first discussion topic to the business agent when the communication session is initiated with the customer.

23. The system of claim 1, wherein the one or more second discussion topics comprise the first discussion topic.

* * * * *